United States Patent [19]

Magin

[11] Patent Number: 4,476,743

[45] Date of Patent: Oct. 16, 1984

[54] SELECTIVE DRIVING MECHANISM

[75] Inventor: Ludwig B. Magin, Schifferstadt, Fed. Rep. of Germany

[73] Assignee: Deere & Company, Moline, Ill.

[21] Appl. No.: 438,434

[22] Filed: Nov. 2, 1982

[30] Foreign Application Priority Data

Nov. 12, 1981 [EP] European Pat. Off. ........ 81401788.5

[51] Int. Cl.³ ......................... F16H 37/06; F16H 1/14
[52] U.S. Cl. ................................. 74/665 GB; 74/417; 74/423; 74/424; 192/20; 192/48.9
[58] Field of Search .................. 74/665 GB, 417, 423, 74/424; 192/20, 48.8, 48.9

[56] References Cited

U.S. PATENT DOCUMENTS

| | | | |
|---|---|---|---|
| 1,300,398 | 4/1919 | Jaeger | 192/48.9 X |
| 2,878,690 | 3/1959 | Capron et al. | 74/665 GB X |
| 3,198,301 | 8/1965 | Randall | 192/48.9 X |
| 3,478,620 | 11/1969 | Shimanckas | 74/665 GB |
| 4,344,760 | 8/1982 | Kulikowski | 74/665 GB X |

*Primary Examiner*—Allan D. Herrmann
*Assistant Examiner*—D. Wright

[57] ABSTRACT

A selective driving mechanism includes an input shaft and two output shafts. The input shaft and the output shaft have profiled parts that can be engaged and disengaged with each other. A control member is movable between two selective positions in which only one or the other of the output shafts is drivingly engaged with the input shaft. The control member may be a sliding sleeve or a bell crank lever.

6 Claims, 3 Drawing Figures

SELECTIVE DRIVING MECHANISM

BACKGROUND OF THE INVENTION

The present invention relates to a mechanism for the selective driving of machines or devices from the power take-off shaft of an agricultural tractor.

It is already known, in agricultural machinery, especially for the driving of movable members of a forage harvester or a similar machine, this term covering pick-up mowing machines, silage makers, etc., to provide a transmission mechanism comprising an input shaft driven from the power take-off shaft of the tractor and two output shafts. One of the output shafts is connected by a suitable transmission to these movable members of the forage harvester, which is most often coupled laterally to the tractor, while the other output shaft may be connected to any device, such as a device provided on a trailer that may be coupled to the tractor. Such a mechanism then merely comprises a set of bevel gears which provide the desired kinematic distribution.

But, in certain countries, the regulations in force forbid the simultaneous driving of a forage harvester and a device provided on a trailer which is coupled to the same tractor as the forage harvester.

With a view to adaptation of these specific regulations, there has therefore been provided for the above-mentioned driving mechanism a single output shaft which provides the drive of the forage harvester, while any possibility of driving the device or devices which are provided on the trailer has been abandoned, or else, there has been fitted on the existing mechanism a stationary cap covering the second output shaft which may normally be connected to the trailer, avoiding, in this second case, a more fundamental modification of the system.

It will nevertheless be understood that this solution, which consists in abandoning the possibility of driving a device other than the forage harvester, itself, from the power take-off shaft of the tractor, represents a handicap to the scheme of work since another motor group must be provided if a device provided on a trailer is to be driven.

SUMMARY OF THE INVENTION

An object of the invention is to provide a mechanism which is arranged so as to prevent any simultaneous driving of the two output shafts of the mechanism while enabling them to be selectively driven.

This and other objects are achieved by a mechanism which includes an input shaft which can be drivably connected to the power take-off shaft of an agricultural tractor and, in operation, can be permanently rotationally driven and includes two output shafts. The input shaft, on the one hand, and the output shafts or members coupled for rotation therewith, on the other hand, have profiled parts which can be engaged and disengaged with each other. A control member is displaceable between two selective positions in each of which engagement or disengagement is obtained between the profiled parts of the input shaft and those of one of the output shafts, while the profiled parts of the other output shaft are disengaged from those of the input shaft.

Thus, by the displacement of the control member, it is possible to ensure, at will, the driving of one or the other of the output shafts, that is to say, of the forage harvester or a device provided on a trailer coupled to the tractor, while all simultaneous drive is prevented. The advantages of the known mechanisms used in this field are thus retained, while at the same time, the regulations in force in certain countries are respected.

One of the output shafts, which may be drivably connected to a forage harvester, extends transversely to the input shaft. The other output shaft extends in the prolongation of the input shaft and may be drivably connected to a device provided on a trailer coupled to the agricultural tractor.

According to a possible embodiment, the mechanism comprises, on the end portion of the input shaft, a splined region on which is mounted a sliding sleeve or like member which is fixed for rotation with the input shaft, the shaft having at its end splines or like profiled parts, and the two output shafts or members drivably connected therewith are freely mounted on journal bearings provided on the input shaft, one on each side of the splined region, the output shafts or the members drivably connected therewith, likewise having splines or equivalent profiled parts located opposite the sliding sleeve and capable of being brought into engagement. The spacing between the output shafts or the members is drivably connected therewith and the length of the sliding sleeve being such that the splines of the said sliding sleeve can only enter into engagement with the splines of one of the output shafts or of the members connected therewith at any given moment.

In the case of a forage harvester coupled laterally to an agricultural tractor, the output shaft of the mechanism intended for driving the forage harvester extends transversely to the longitudinal direction of the tractor, and hence, perpendicularly to the power take-off shaft of the tractor, while the second output shaft should be directed towards a trailer, for example, coupled behind the tractor and consequently, extends in the prolongation of the input shaft.

In this case, there is provided, according to the invention, on the input shaft of the mechanism, a bevel gear which is freely mounted and meshes with another bevel gear keyed on the output shaft intended for driving the forage harvester. The first bevel gear has a hub provided with splines or equivalent profiled parts with which the corresponding splines of the sliding sleeve can be brought into engagement. The second output shaft, which is designed to be coupled, for example, to a device provided on a trailer and extends in the prolongation of the input shaft, may, with advantage, be mounted on a journal pin on the end of the input shaft and its free end is provided with splines or equivalent profiled parts with which the corresponding splines of the sliding sleeve can cooperate. The latter can be brought selectively into one or the other of its two coupling positions by sliding on the input shaft. Locking means are advantageously provided for locking the sliding sleeve in one or other of its two coupling positions.

If desired, the sliding sleeve may, in addition, be able to occupy a mid position in which neither of the two output shafts is driven.

According to a modification, the end of the input shaft, on the one hand, and an intermediate shaft mounted in the casing of the mechanism and constantly driven by the input shaft, on the other hand, are constituted by hollow shafts and are provided at one end with splines or equivalent profiled parts. There are also provided first and second output shafts likewise provided with splines or equivalent profiled parts which can be brought into engagement with the splines or equivalent profiled parts of the hollow shafts and are slidably mounted by a terminal part in these hollow shafts. These output shafts normally occupy positions perpendicular to each other and there is provided a control member in the form of a bell crank lever which is connected by its arms to each of the said sliding output shafts so that the angular displacement in one direction of the bell crank lever longitudinally displaces the output shaft in opposite directions, so as to produce the coming into engagement and the driving of one of the shafts and the simultaneous disengagement of the other shaft. Thus, any simultaneous driving of the two output shafts is prevented with certainty.

DETAILED DESCRIPTION

Figure 1:
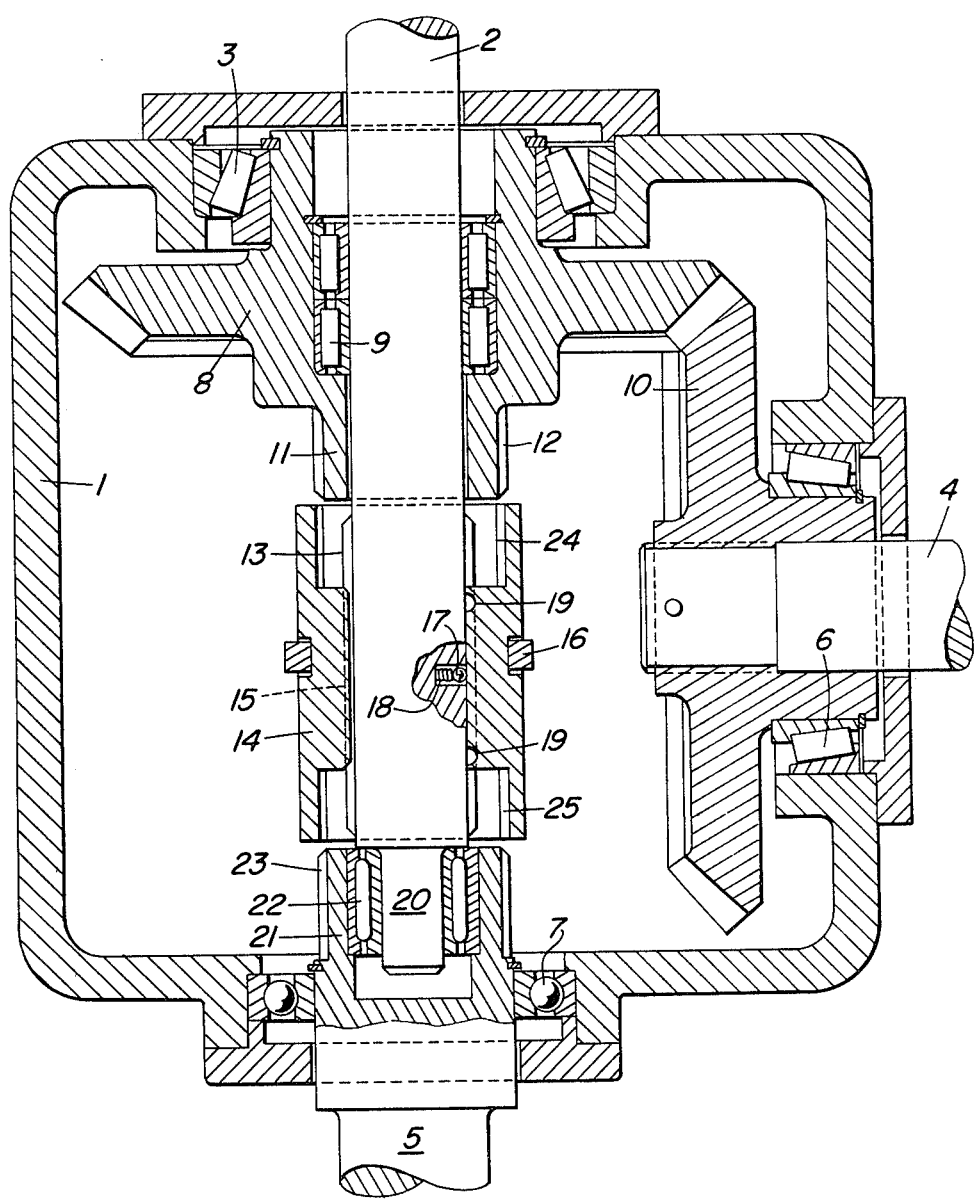
FIGS. 1 and 2 are diagrammatic plan views of two embodiments of the mechanism according to the invention.

The selective driving mechanism shown in FIG. 1 includes a housing 1 in which an input shaft 2, which is connected to the power take-off shaft of an agricultural tractor, is rotatably mounted by means of a rolling bearing 3.

The mechanism includes two output shafts, namely an output shaft 4 disposed laterally which is designed to drive a forage harvester, (not shown), coupled laterally to an agricultural tractor, and an output shaft 5, which is designed to be coupled to a device provided, for example, on a trailer, (not shown), coupled to the said agricultural tractor. The output shaft 5 is located in the prologation of the input shaft 2. The shafts 4 and 5 are rotatably mounted in the housing 1 by means of roller bearings 6 and 7, respectively.

A bevel gear 8 is rotatably mounted on the input shaft 2 by a needle roller bearing 9. This bevel gear 8 is in mesh with another bevel gear 10 which is keyed on the output shaft 4 that drives the forage harvester. The bevel gear 8 also includes a hub 11 provided with external splines 12.

The input shaft 2 has, at the end thereof, beyond the bevel gear 8, a part provided with external longitudinal splines in the form of a slideway 13 on which a sliding lever 14 is slidably mounted by means of corresponding interior splines 15.

The movement of the sliding lever 14 is effected by a fork 16. The positioning thereof in one or the other of its two working positions is obtained by means of a locking ball 17 subjected to the action of a compression spring 18 mounted in the shaft 2 and capable of selective engagement in one or the other of two recesses 19 formed in the interior surface of the sliding sleeve 14.

The end of the input shaft 2 has an axial journal pin 20 which is rotatably mounted in the hollow end, which forms a hub 21, of the output shaft 5 by means of a needle roller bearing 22. The outer surface of this hub 21 is provided with longitudinal splines or equivalent profiled parts 23.

The sliding sleeve 14 has tubular ends provided with longitudinal splines 24, 25 which can be selectively engaged with the splines 12 of the hub 11 of the bevel gear 8 on the one hand or the splines 23 of the hub 21 of the output shaft 5 on the other hand.

It will be seen that the spacing between the splines 12, 23 and the length of the sliding sleeve 14 is such that the splines of the sleeve can never be simultaneously engaged with the splines 12, 23.

In the position shown in FIG. 1, the sliding sleeve 14 occupies a mid position in which neither of the two output shafts is driven. If desired, a locking similar to that mentioned above may be provided for fixing the sliding sleeve in this mid position.

If the sliding sleeve 14 is displaced by means of the fork 16, for example, upwardly, as seen in the drawing, the splines 24 are brought into engagement with the splines 12 so that a rotational connection is established between the input shaft 2 and the bevel gear 8, and consequently, between the input shaft 2 and the output shaft 4 which produces the driving of the forage harvester while the output shaft 5 is not driven.

If, on the contrary, the sliding sleeve 14 is displaced downwardly from its mid position shown in the drawing, the splines 25 become engaged with the splines 23 of the output shaft 5 and the latter is driven from the input shaft 2, while the input shaft 2 rotates freely in the hub of the bevel gear 8 and consequently, the output shaft 4 is not driven.

It will be seen that the advantages of driving the forage harvester from the power take-off shaft of the tractor are maintained, while a simultaneous driving is avoided with certainty.

Figure 2:
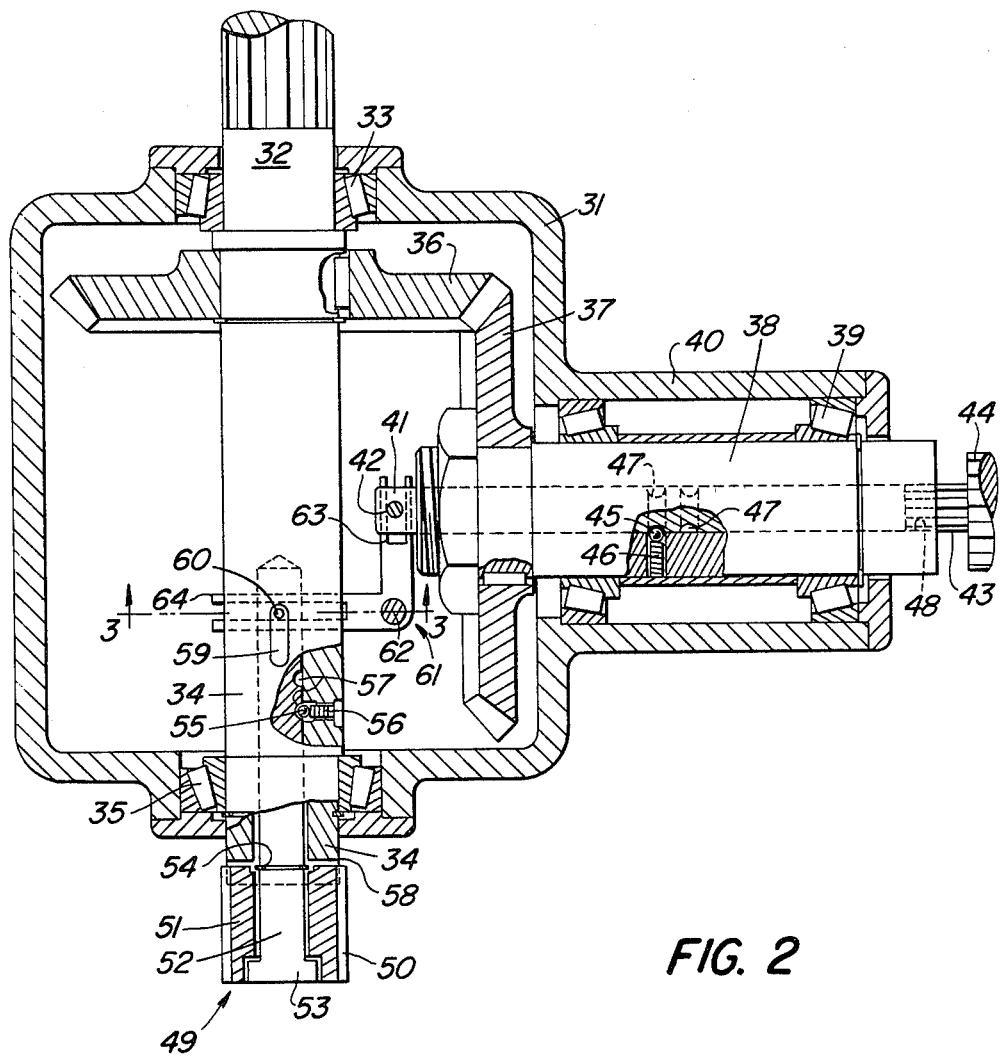
Figure 3:
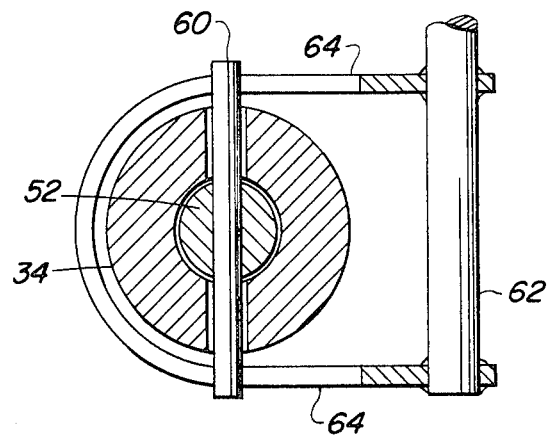
FIG. 3 is a sectional view along lines 3—3 of FIG. 2.

A varient embodiment of the invention has been shown in FIGS. 2 and 3. This mechanism comprises a housing 31 in which an input shaft 32 is journalled by means of a rolling bearing 33. The input shaft 32 is drivably connected to the power take-off shaft of a tractor. The shaft 32 extends through the housing 31 and its end part 34 is in the form of a hollow shaft journalled in the housing by a rolling bearing 35.

In the interior of the housing 31, the shaft 32 carries a bevel gear 36 keyed on shaft 32 and which is in mesh with another bevel gear 37 keyed on a hollow shaft 38 journalled by means of a rolling bearing 39 in a boss 40 on the housing 31. The shaft 38 is oriented perpendicularly to the shaft 32. It is designed for driving the forage harvester.

For this purpose, there is provided within the hollow shaft 38 a sliding shaft 41 which carries at its free end a control finger 42, the function of which will be explained later.

The shaft 41 has, at the end remote from the finger 42, a part provided with longitudinal splines 43, which part adjoins the output shaft 44 of the mechanism.

The longitudinal position of the shaft 41 in the hollow shaft 38 is determined by a locking ball 45 subjected to the action of a compression spring 46 mounted in the hollow shaft 38 and capable of engaging in one or the other of two longitudinally spaced apart recesses 47 provided in the shaft 41.

The hollow shaft 38 has interior splines 48 on the end thereof which are oriented towards the shaft 44.

In the position of shaft 41, shown in the drawing, the splines 43 are disengaged from the splines 48 so that the hollow shaft 38, which is driven from the input shaft 32 via the pair of bevel gears 36, 37 rotates freely with respect to the free output shaft 44.

In the other position, the splines 43 are in engagement with the splines 48 so that the shaft 44 and the forage harvester are driven.

As shown, the input shaft 32 terminates in a hollow shaft 34. The second output shaft 49 of the mechanism, which is designed for example for driving a device provided on a trailer coupled to the forage harvester, has the form of a power take-off shaft provided with external splines 50 which can be brought into engagement with an articulated shaft (not shown) drivably connected to the trailer in a conventional manner.

The output shaft 49 includes a sleeve 51 which is freely mounted on one end part of the inner shaft 52 on which it is axially fixed by a terminal shoulder 53 of this inner shaft and by a retaining ring or circlip 54.

The end part of the inner shaft 52 can slide in the bore of the hollow part 34 of the shaft 32 and it can be held stationary in one or the other of two positions by means of a ball 55 subjected to the action of a compression spring 56 mounted in the shaft 32, 34 and capable of selective engagement in one or the other of two recesses 57 that are longitudinally spaced apart from each other on the end part of the inner shaft 52.

The hollow shaft 34 and the sleeve 51 have, on their opposed end surfaces, teeth or dogs, shown at 58 which, in the position shown in the drawing, are in engagement but which may be disengaged from each other, as described later, upon axial dispacement of the end part of the inner shaft 52 within the hollow shaft 34.

There are provided in the hollow shaft 34 two longitudinal, diametrically opposed slots 59 in which are engaged fingers 60 carried by the end part of the inner shaft 52 and projecting outwardly.

For control, a right-angle bell crank lever 61 is mounted for pivotal movement about an axis pin 62 perpendicular to the plane containing the axes of the shafts 34 and 38. This lever has arms 63, 64 in the form of forks which cooperate with the fingers 42 and 60.

The teeth or dogs 58 of the hollow shaft 34 and of the sleeve 51 that forms the output shaft 49 are in engagement so that a connection is established between the input shaft 32 and the output shaft 49. In this condition, the splines 43 are disengaged from the splines 48 so that the hollow shaft 38 rotates about the shaft 41 without driving the other output shaft 44.

If the bell crank lever 61 is pivoted anti-clockwise from the position shown, the end part of the inner shaft 52 is pushed back by the fingers 60 which slide in the slots 59 of the hollow shaft 34 while continuing to rotate. This end part of the shaft 52 then displaces the sleeve 51 axially by means of the circlip 54 so that it disengages the teeth or dogs 58 which were initially in engagement with each other. Thus, the sleeve 51 is no longer rotationally driven and the end part of the shaft 52 rotates freely within the sleeve 51. The output shaft 49 is then disconnected from input shaft 32. As a result of this displacement of the control lever 61 by its arm 63 and finger 42, there is also obtained a displacement of the output shaft 44 to the left so that the splines 43 become engaged with the interior splines 48 of the shaft 38.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications, and variations which fall within the spirit and scope of the appended claims.

I claim:

1. A selective driving mechanism comprising:
   an input shaft for drivingly connecting to a power-take-off of a vehicle and having a hollow portion with a splined end;
   a driven shaft constantly driven by the input shaft and having a hollow portion with a splined end;
   first and second axially slidable output shafts oriented perpendicular with respect to each other and having splined parts engageable with the splined ends of the input shaft and the driven shaft; and
   a bell crank lever having first and second arms, each coupled with a respective one of the first and second output shafts so that angular displacement of the lever causes axial movement of the output shafts to couple and uncouple the output shafts with the input shaft and the driven shaft.

2. The selective driving mechanism of claim 1, wherein one of the output shafts includes a rod which is slidably mounted inside the driven shaft.

3. The selective driving mechanism of claim 2, wherein the rod has a free end which is coupled to one of the arms of the bell crank lever.

4. The selective driving mechanism of claim 1, further comprising:
   an inner shaft slidably mounted for axial movement within the input shaft and coupled for rotation with the input shaft, and
   an end shaft axially fixed and rotatably coupled to an end of the inner shaft.

5. The selective driving mechanism of claim 4, wherein the second output shaft comprises a hollow sleeve coaxially and rotatably mounted on and retained by the end shaft, an end face of the sleeve having splines engageable with the splined end of the input shaft.

6. The selective driving mechanism of claim 4, wherein the input shaft has an axially elongated slot extending radially therethrough for receiving a finger which is engageable with one of the arms of the bell crank lever.

* * * * *